United States Patent
Lee et al.

(10) Patent No.: US 11,095,245 B2
(45) Date of Patent: Aug. 17, 2021

(54) APPARATUS FOR CONTROLLING INVERTER TO DRIVE MOTOR

(71) Applicants: HYUNDAI MOTOR COMPANY, Seoul (KR); KIA MOTORS CORPORATION, Seoul (KR)

(72) Inventors: Yong Jae Lee, Hwaseong-Si (KR); Mu Shin Kwak, Hwaseong-Si (KR); Joo Young Park, Yongin-Si (KR); Jae Ho Hwang, Daejeon (KR); Ho Joon Shin, Suwon-Si (KR); Sung Kyu Kim, Bucheon-Si (KR); Su Hyun Bae, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 204 days.

(21) Appl. No.: 16/200,073

(22) Filed: Nov. 26, 2018

(65) Prior Publication Data
US 2020/0127592 A1    Apr. 23, 2020

(30) Foreign Application Priority Data
Oct. 18, 2018  (KR) .......................... 10-2018-0124611

(51) Int. Cl.
*H02P 27/08* (2006.01)
*H02P 21/22* (2016.01)
(Continued)

(52) U.S. Cl.
CPC ...... *H02P 27/085* (2013.01); *H02M 7/53871* (2013.01); *H02P 21/14* (2013.01); *H02P 21/22* (2016.02)

(58) Field of Classification Search
CPC combination set(s) only.
See application file for complete search history.

(56) References Cited

U.S. PATENT DOCUMENTS 6,069,808 A * 5/2000 Panahi ............. H02M 7/53875
363/98
6,088,246 A * 7/2000 Okuyama ........... H02M 7/5395
363/132

(Continued)

FOREIGN PATENT DOCUMENTS

KR  10-2016-0007850 A    1/2016

*Primary Examiner* — Jorge L Carrasquillo
(74) *Attorney, Agent, or Firm* — Morgan, Lewis & Bockius LLP

(57) ABSTRACT

An apparatus for controlling an inverter to drive a motor includes: a current control processor generating a voltage command for generating d/q axis current detection values, which are obtained by measuring current supplied to the motor, to follow a d/q axis current command for driving the motor, the current control processor converting the voltage command, which is sampled according to a sampling frequency generated based on a voltage vector phase of the voltage command, into a voltage vector corresponding to a point on each vertex and each side of a hexagon in a voltage vector diagram to apply a resulting value to the inverter driving the motor; and a sample frequency computing processor computing the sampling frequency based on the voltage vector phase of the voltage command and a reference number of sampling times during one rotation period of the motor.

6 Claims, 6 Drawing Sheets

(51) Int. Cl.
*H02P 21/14* (2016.01)
*H02M 7/5387* (2007.01)

(56) References Cited

U.S. PATENT DOCUMENTS

| | | | | |
|---|---|---|---|---|
| 6,529,393 B1* | 3/2003 | Yu | ............... | H02M 7/497 |
| | | | | 318/811 |
| 2010/0231145 A1* | 9/2010 | Hobraiche | ........ | H02M 7/53875 |
| | | | | 318/139 |
| 2015/0008860 A1* | 1/2015 | Lee | ............... | H02P 27/04 |
| | | | | 318/503 |
| 2016/0006381 A1* | 1/2016 | Park | ............... | H02P 6/14 |
| | | | | 318/400.02 |
| 2017/0179844 A1* | 6/2017 | Schumacher | ........... | H02M 7/06 |

* cited by examiner

… (1)

APPARATUS FOR CONTROLLING INVERTER TO DRIVE MOTOR

CROSS REFERENCE TO RELATED APPLICATION

The present application claims priority to Korean Patent Application No. 10-2018-0124611, filed Oct. 18, 2018, the entire contents of which is incorporated herein for all purposes by this reference.

TECHNICAL FIELD

The present disclosure relates generally to an apparatus for controlling an inverter to drive a motor. More particularly, the present disclosure relates to an apparatus for controlling an inverter to drive a motor, the apparatus being capable of enhancing motor control performance and freedom of control at high speed by increasing a sampling frequency.

BACKGROUND

Generally, a system for driving a motor includes a power storage device such as a battery, an inverter that converts DC power stored in the power storage device to AC power for driving a motor, and the motor.

Here, the inverter includes multiple switching elements, and the multiple switching elements are controlled by a pulse-width modulation (PWM) method to generate AC power. AC power generated by the inverter is provided to the motor to run the motor.

In providing an AC voltage from the inverter to the motor, it is well known that when the inverter is controlled with a 6-step operation, the current consumed by the motor is reduced under the same output condition. Supplying of the voltage to the motor by controlling the inverter with the 6-step operation results in enhancement of output and efficiency of the inverter and the motor, and of system efficiency of an eco-friendly vehicle, such as an electric vehicle, a hybrid vehicle, a fuel cell vehicle equipped with the motor, or the like, as well as of fuel efficiency.

There are various ways to implement 6-step operation. For example, there is a 12-sample phase control method using high gain over voltage modulation (HOVM), such that a specific gain is applied to a command voltage vector to intentionally move the command voltage vector far away from the origin in a d-q vector space and the command voltage vector is converted into a vertex of a hexagon in a voltage vector diagram using a minimum distance overmodulation technique to maximally utilize the inverter output.

The 12-sample phase control technique performs sampling 12 times per cycle, so that control is performed to have a phase difference of ±15 degrees with respect to each vertex in the voltage vector diagram. Therefore, the voltage vector positioned at ±15 degrees with respect to each vertex is directed to a reference vertex through minimum distance overmodulation, so that the output vector of HOVM maintains a constant switching state in one entire cycle. That is, switching vectors are repeated on a per-switching cycle basis to fix the output of HOVM in duty in the 12-sample phase control technique.

As described above, the conventional 12-sample phase control technique is limited in that the current control performance is degraded and freedom of control is limited due to fixed duty for each switch. In addition, the conventional 12-sample phase control technique has a problem that when taking into consideration the motor with fast speed, current control performance is degraded during high-speed operation because the number of sampling times compared to the rotation frequency of the rotor is small.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose an apparatus for controlling an inverter to drive a motor, the apparatus capable of enhancing motor control performance and freedom of control at high speed by increasing a sampling frequency, in controlling the inverter with a 6-step control technique.

In order to achieve the above object, according to one aspect of the present disclosure, an apparatus for controlling an inverter to drive a motor includes: a current control processor generating a voltage command for generating d/q axis current detection values, which are obtained by measuring a current supplied to the motor, to follow a d/q axis current command for driving the motor, the current control processor converting the voltage command, which is sampled according to a sampling frequency generated based on a voltage vector phase of the voltage command, into a voltage vector corresponding to a point on each vertex and each side of a hexagon in a voltage vector diagram to apply a resulting value to the inverter driving the motor; and a sample frequency computing processor computing the sampling frequency based on the voltage vector phase of the voltage command and a reference number of sampling times during one rotation period of the motor.

The current control processor may include: a current controller generating the voltage command; a high gain over voltage modulation (HOVM) controller generating multiple HOVM voltage commands corresponding to the number of sampling times by multiplying the voltage command by a reference gain according to the sampling frequency; and a voltage modulator converting the multiple HOVM voltage commands generated by the HOVM controller into the voltage vector corresponding to one point on vertexes and sides of the hexagon in the voltage vector diagram through minimum distance overmodulation control.

The sample frequency computing processor may determine the sampling frequency in such a manner that with respect to a d axis on the hexagon in the voltage vector diagram, a sum of q values at two sampling points which are consecutively present above and below the d axis is zero.

The sample frequency computing processor may determine the sampling frequency by determining an on and off sequence of an inverter output in a sampling section for the sampling frequency.

The apparatus may further include: a first adder adding, with respect to a d axis on the hexagon in the voltage vector diagram, q values at two sampling points which are consecutively present above and below the d axis; a sequence discriminator determining reference on and off sequences repeated in successive sampling sections for the sampling frequency and alternately outputting values of 1 and −1 corresponding thereto every sampling cycle; a multiplier multiplying a sum output from the adder by the value output from the sequence discriminator; a frequency controller controlling a result of multiplication by the multiplier to converge into zero; and a second adder adding the frequency change value and a value obtained by dividing a switching frequency of the motor by the number of sampling times so as to determine the sampling frequency.

The sample frequency computing processor may change a switching duty of an output voltage of the inverter by adjusting the sampling frequency.

The voltage vector corresponding to one point on the side of the hexagon in the voltage vector diagram may be a voltage vector in which the voltage vector corresponding to two adjacent points of the hexagon is output with a predetermined ratio.

The voltage vector corresponding to one point on the side of the hexagon in the voltage vector diagram may cause switching of a switch within the inverter.

According to the apparatus for controlling the inverter to drive the motor, multi-sampling exceeding 12 samples can be stably performed within one rotation period of the motor or one switching cycle of an inverter output voltage. Accordingly, the apparatus for controlling the inverter to drive the motor may enhance current control performance of the inverter as well as freedom of control.

Particularly, the apparatus for controlling the inverter to drive the motor may prevent additional and unnecessary switching from occurring in switching of switching elements the within the inverter by discriminating switching sequences, thereby preventing the inverter output voltage from decreasing.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinbelow, an apparatus for controlling an inverter to drive a motor according to exemplary embodiments of the present disclosure will be described in detail with reference to the accompanying drawings.

Figure 1:
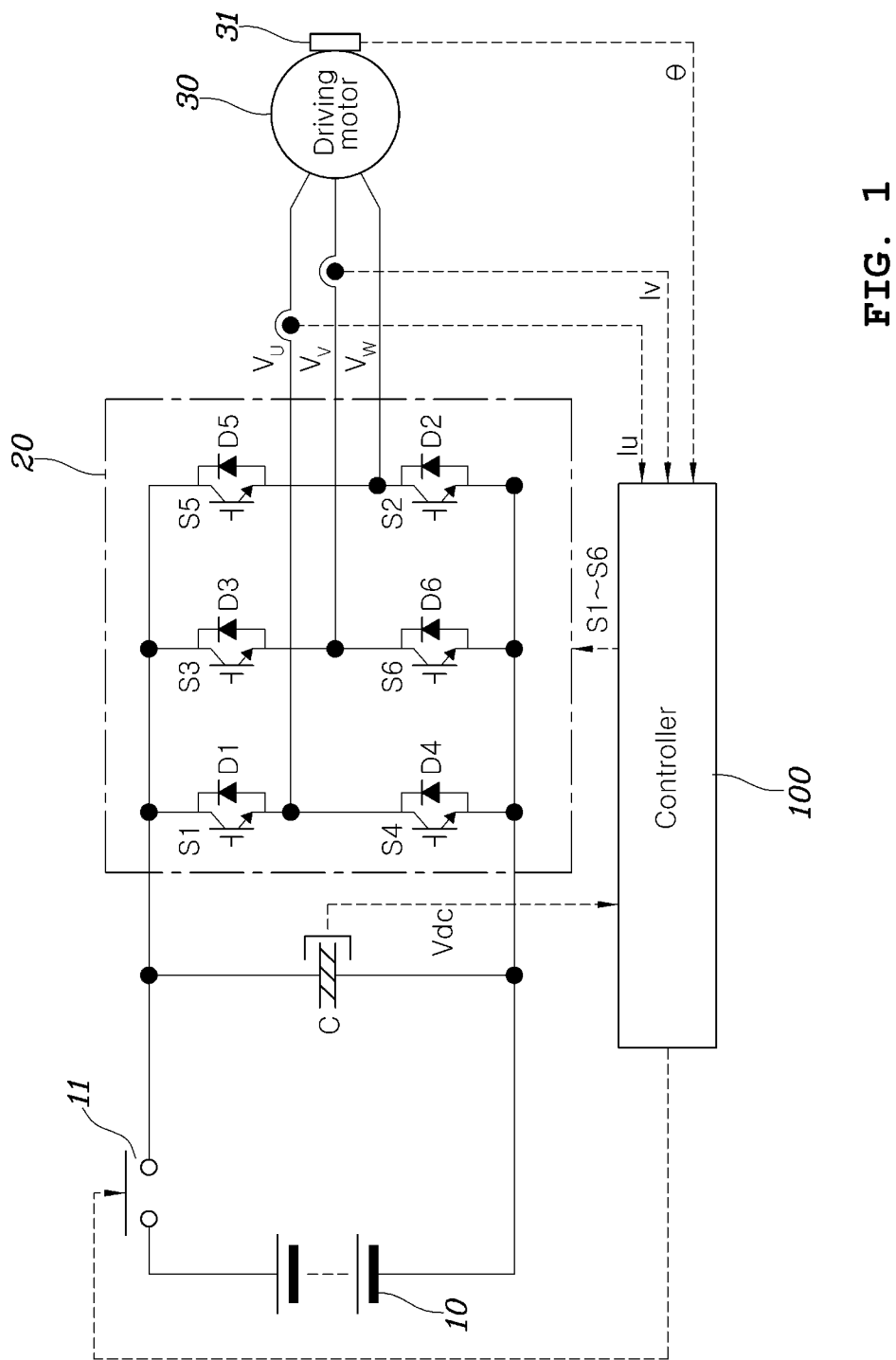
FIG. 1 is a circuit diagram illustrating a motor driving system to which an apparatus for controlling an inverter to drive a motor is applied according to an embodiment of the present disclosure.

FIG. 1 is a circuit diagram illustrating a motor driving system to which an apparatus for controlling an inverter to drive a motor is applied according to an embodiment of the present disclosure.

Referring to FIG. 1, the motor driving system to which an apparatus for controlling an inverter to drive a motor according to the embodiment of the present disclosure may include an energy storage 10, an inverter 20, a motor 30, a rotation angle sensor 31, and a controller 100.

The energy storage 10 is an element, such as a battery, or the like, which stores electric energy for driving the motor 30 in the form of direct current, and outputs a DC power.

The inverter 20 is an element that converts the DC power, which is stored in the energy storage 10, to an AC power for driving the motor. The inverter may include multiple switching elements S1 to S6 of which on/off states are controlled by a pulse-width modulation signal provided from the controller 100.

The motor 30 is an element that receives three-phase AC power from the inverter 20 and generates torque. Various types of motors known in the art may be employed. In an eco-friendly vehicle, the motor that provides torque to a drive wheel of the vehicle may referred to as a driving motor.

The rotation angle sensor 31 is an element that detects the position, namely, the rotation angle of the rotor of the motor. The rotation angle sensor may detect the angle of the rotor of the motor 30, and may continuously output rotation angle detection signals including information on the detected rotation angle of the rotor. For example, the rotation angle sensor 31 may be implemented by a resolver, or the like.

The controller 100 fundamentally performs control of the pulse-width modulation method in which a duty cycle (a duty ratio) of the switching elements S1 to S6 of the inverter 20 is appropriately adjusted so as to control the torque of the motor 30 to a desired value. For this control, at a specific point in time, the controller 100 samples the signals provided from the rotation angle sensor 31 and current detection values Iu and Iv provided to the motor 30, and on the basis of the sampled values, derives torque-related information of the motor 30 in operation. Next, the controller 100 controls the switching elements S1 to S6 within the inverter 20 on the basis of the result of comparing a torque command value (a torque target value desired to be obtained through the motor 30) for the motor 30, which is input from the outside, with the torque-related information of the motor 30 in operation, which is derived on the basis of the sampled values, in such a manner that the motor 30 outputs a value corresponding to the torque command value.

In the embodiment of the present disclosure, the controller 100 controls the inverter 20 with a 6-step operation technique, and particularly controls the motor by applying high gain over voltage modulation (HOVM) at a high sampling frequency. The controller 100 in FIG. 1 may be the apparatus for controlling the inverter according to the present disclosure.

In FIG. 1, the reference numeral "11" denotes a relay provided to determine electrical connection states between the energy storage 10 and the inverter 20. In the case of applying the system shown in FIG. 1 to the eco-friendly vehicle, the relay is controlled by the controller 100 in such a manner as to be turned on when the vehicle starts and as to be turned off when the vehicle shuts down. Also, in FIG. 1, the reference sign "C" denotes a DC link capacitor that serves as a shunt connected to a terminal to which the energy storage 10 and the inverter 20 are connected, and the voltage Vdc across the DC link capacitor forms a DC input voltage provided to the inverter 20. The voltage Vdc across the DC link capacitor is provided to the controller 100 and is applied to control the inverter 20.

Figure 2:
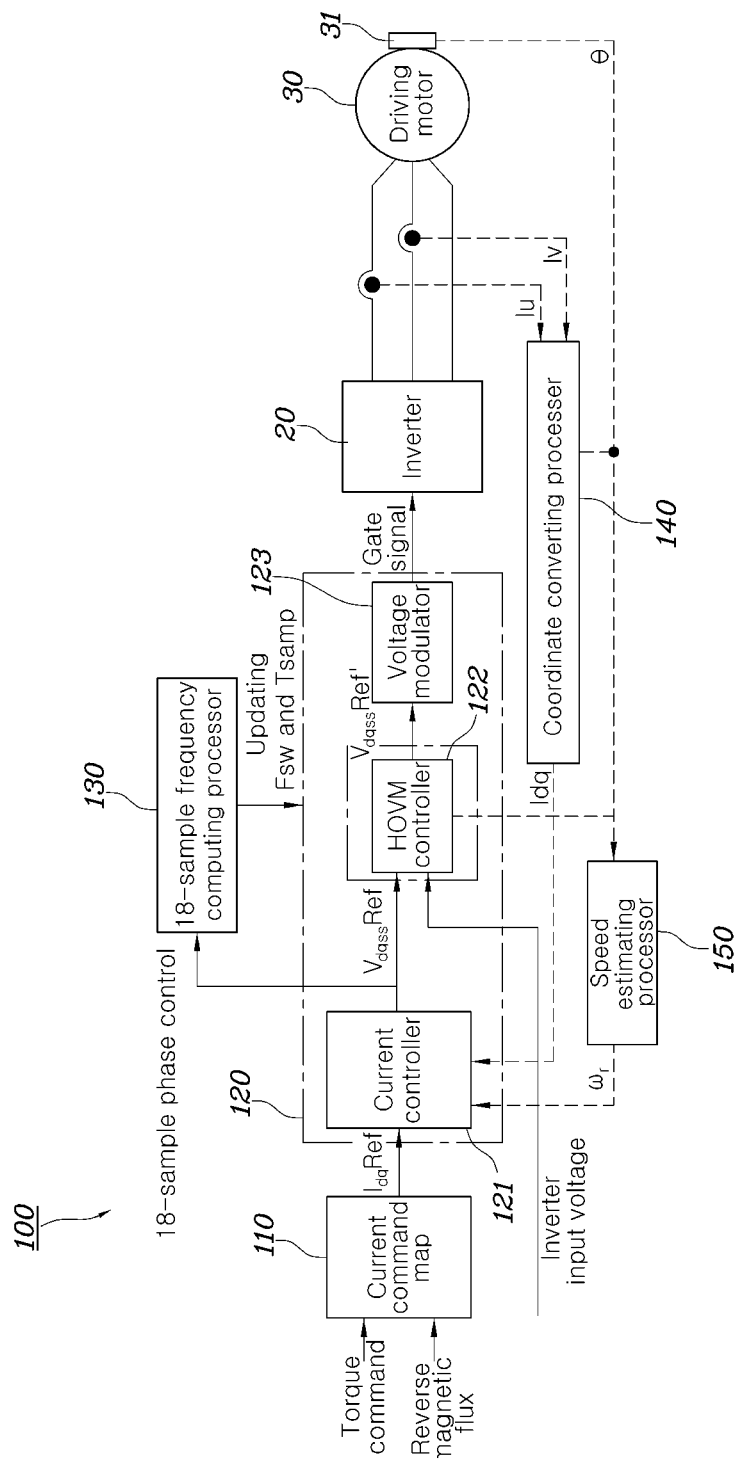
FIG. 2 is a block diagram illustrating in detail an apparatus for controlling an inverter to drive a motor according to an embodiment of the present disclosure.

FIG. 2 is a block diagram illustrating in detail an apparatus for controlling an inverter to drive a motor according to an embodiment of the present disclosure, which is the detailed configuration of the controller 100 shown in FIG. 1.

Referring to FIG. 2, according to the embodiment of the present disclosure, the apparatus (the controller 100 in FIG. 1) for controlling the inverter to drive the motor may include: a current command map 110 receiving a torque command from the outside and reverse magnetic flux of the motor and outputting a current command $I_{dq}$Ref of the motor corresponding thereto; a current control processor 120 comparing a current command $I_{dq}$Ref with the current detection values, which are obtained by detecting the current provided to the motor 30, and generating a voltage command $V_{dqss}$Ref for making the current detection values follow the current command $I_{dq}$Ref, the current control processor 120 generating a gate signal that controls on/off operation of the switching elements S1 to S6 within the inverter 20 by applying a HOVM method in such a manner to produce an output of the inverter 20, which corresponds to the voltage command $V_{dqss}$Ref; and a sample frequency computing processor 130 determining an operation cycle of the current control processor 120

According to the embodiment of the present disclosure, the apparatus for controlling the inverter to drive the motor may further include: a coordinate converting processor 140 converting the coordinates of the current detection values obtained by detecting the current provided to the motor 30; and a speed estimating processor 150 estimating a rotational speed of the motor 30 by using rotation angle information detected by the rotation angle sensor 31 installed on the motor 30.

The current command map 110 may store the current command $I_{dq}$Ref in advance, to which the torque command and the reverse magnetic flux are simultaneously are matched. Accordingly, the current command map 110 receives the torque command of the motor from the outside, such as an upper controller, or the like, and receives a detected value of the reverse magnetic flux output from the motor so that the current command $I_{dq}$Ref corresponding thereto is output. The current command $I_{dq}$Ref may be provided in the form of a d/q axis current command of the stationary coordinate system.

The current control processor 120 may include a current controller 121, an HOVM controller 122, and a voltage modulator 123.

The current controller 121 receives the current command $I_{dq}$Ref from the current command map 110, receives, from the coordinate converting processor 140, a value of the d/q axis current Idq converted from the current detection values Iu and Iv, which are obtained by measuring the current provided to the motor, and receives the rotational speed $\omega_r$ (the rotation frequency) of the motor estimated by the speed estimating processor 150. The current controller 121 may generate the voltage command $V_{dqss}$Ref using the received information.

The current controller 121 may generate the voltage command $V_{dqss}$Ref using a difference component between the d/q axis current command $I_{dq}$Ref output from the current command map 110 and the measured d/q axis current Idq. Particularly, the current controller 121 may be implemented in the form of a proportional integral (PI) controller. The current controller 121 generates the voltage command (the stationary coordinate system) capable of controlling the measured d/q axis current Idq to follow the current command $I_{dq}$Ref with proportional integral control using the difference component between the d/q axis current command $I_{dq}$Ref and the measured d/q axis current Idq.

The HOVM controller 122 generates, on the basis of a switching frequency Fsw and a sampling frequency Fsamp determined by the sample frequency computing processor 130, multiple HOVM output voltages $V_{dqss}$Ref' per single period of a fundamental wave by multiplying the voltage command $V_{dqss}$Ref output from the current controller 121 by a reference gain.

The voltage modulator 123 generates the voltage command corresponding to one point on the vertexes or sides of the hexagon in the voltage vector diagram from the HOVM voltage command $V_{dqss}$Ref' through minimum distance overmodulation control, and applies the result to the inverter.

The sample frequency computing processor 130 generates the switching frequency Fsw and the sampling frequency Fsamp for sample phase control by using a vector phase component of the voltage command $V_{dqss}$Ref being input. For example, in the embodiment of the present disclosure, a switching frequency component and a sampling frequency component for 18-sample phase control may be generated. The switching frequency Fsw is a driving frequency of the motor corresponding to one rotation of the motor, and may be determined as the sampling frequency is determined on the basis of the number of sampling times within one rotation of the motor.

The apparatus for controlling the inverter to drive the motor according to the embodiment of the present disclosure configured as described above may operate in the following manner to perform 6-step control on the inverter 20.

First, the current command map 110 generates the d/q axis current command $I_{dq}$Ref for driving the motor, and the generated current command $I_{dq}$Ref is input to the current controller 121. With this, the u/v phase current detection values Iu and Iv detected by the current sensor placed at the output side of the inverter 20 are converted into the d/q axis current through coordinate conversion by the coordinate converting processor 140, and the result is input to the current controller 121.

Next, the current controller 121 generates the voltage command $V_{dqss}$Ref using the difference between the received d/q axis current command $I_{dq}$Ref and the actual d/q axis current Idq provided from the inverter 20 to the motor 30. As described above, the current controller 121 may be implemented in the form of the proportional integral (PI) controller. In this case, the current controller 121 applies a proportional gain to the difference between the received d/q axis current command $I_{dq}$Ref and the actual d/q axis current Idq provided from the inverter 20 to the motor 30 and performs integration so that generated is the voltage command $V_{dqss}$Ref in the stationary coordinate system that minimizes the difference between the two values.

Next, the voltage command $V_{dqss}$Ref output from the current controller 121 is provided to the sample frequency computing processor 130, and the sample frequency computing processor 130 detects a voltage vector phase using the voltage command $V_{dqss}$Ref. Also, the sample frequency computing processor 130 uses the detected voltage vector phase and computes the sampling frequency for 18-sample phase control.

In the various embodiments of the present disclosure, each of the current control processor 120, the sample frequency computing processor 130, and the coordinate converting processor 140 in the controller 100 may be a central processing unit (CPU) as an electronic circuitry within a computer that carries out instructions of a program by performing the basic arithmetic, logic, controlling, and input/output (I/O) operations specified by the instructions. These elements may be separate processors or embedded in one processor, or in an electronic control unit (ECU) which controls the current control processor 120, the sample frequency computing processor 130, and the coordinate converting processor 140 to perform the respective functions. In addition, the current controller 121, the HOVM controller, the voltage modulator 123 may be also a central processing unit (CPU).

Figure 3:
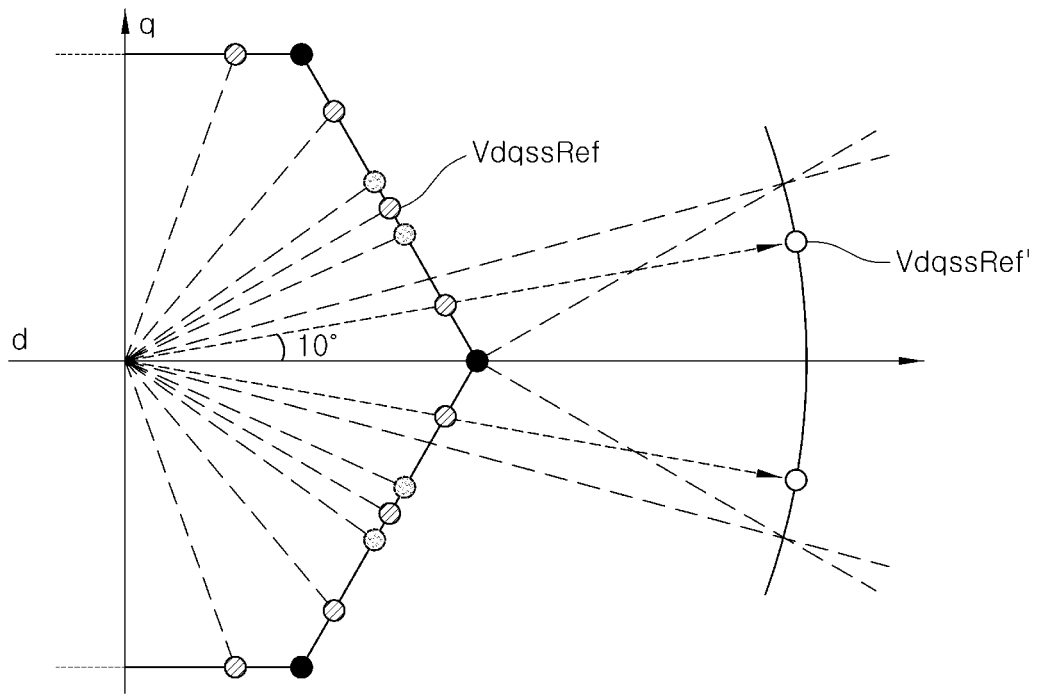
FIG. 3 is a voltage vector diagram in a stationary coordinate system for describing 18-sample phase control applied to an embodiment of the present disclosure.

More specifically, the voltage vector phase of the voltage command $V_{dqss}$Ref detected by the sample frequency computing processor 130 may be expressed in a hexagonal stationary coordinate system as an inverter voltage vector diagram shown in FIG. 3. FIG. 3 is a voltage vector diagram in a stationary coordinate system for describing 18-sample phase control applied to an embodiment of the present disclosure.

In the voltage vector diagram shown in FIG. 3, the hexagon represents the voltage vector phase of the voltage command $V_{dqss}$Ref, and the distance from the origin to the vertex may be determined by the DC voltage input to the inverter 20. The voltage of the inverter 20 may be expressed as a circle with the origin of the stationary coordinate system in center. When inverter voltage usage is 100%, the circle is inscribed on the hexagon. The center (the origin) and each vertex of the hexagon represent the inverter output voltage vector.

The sample frequency computing processor 130 generates the switching frequency Fsw and the sampling frequency Fsamp for 18-sample phase control by using the voltage vector phase component. This means that the switching frequency for 18-sample phase control has 18 samples per period of three-phase fundamental waves of the inverter. When expressing this in the vector diagram in FIG. 3, the sampling frequency Fsamp is a phase control frequency component for generating 18 points on the sides of the hexagon in the voltage vector diagram.

In an ideal case, three sampling points may be formed on one side of the hexagon in the vector diagram in FIG. 3, and sampling points may be formed in such a manner to be vertically symmetric with respect to the d axis.

Figure 4:
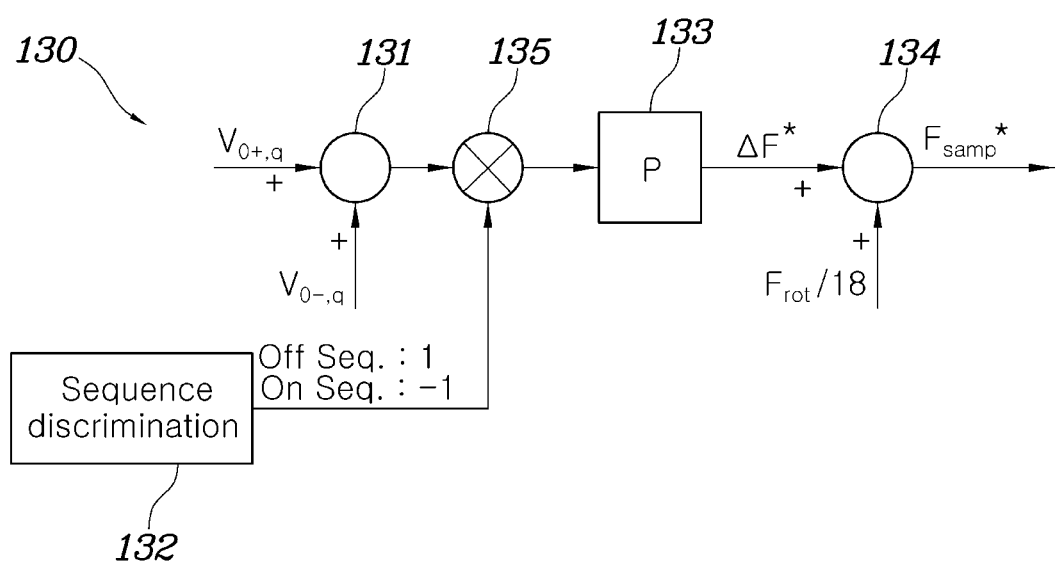
FIG. 4 is a configuration diagram illustrating in detail a sample frequency computing processor of an apparatus for controlling an inverter to drive a motor according to an embodiment of the present disclosure.

FIG. 4 is a configuration diagram illustrating in detail a sample frequency computing processor of an apparatus for controlling an inverter to drive a motor according to an embodiment of the present disclosure.

As described above, in order to form sampling points being vertically symmetric with respect to the d axis on the hexagon in the vector diagram, the sample frequency computing processor 130 adjusts the sampling frequency in such a manner that with respect to the d axis on the hexagon in the voltage vector diagram, the sum of q values at two sampling points which are consecutively present above and below the d axis is zero. That is, the sample frequency computing processor 130 may adjust the sampling frequency by comparing the q values at the two points designed by $V_{0+}$ and $V_{0-}$ in FIG. 3. The frequency component capable of setting the sum of the q values at the two points to zero is the phase control frequency component that produces the desired number of sampling times per cycle of the output voltage of each phase of the inverter to the hexagon in the voltage vector diagram.

As described above, when the sampling frequency is set to the optimum in sampling phase control, the two points designated by $V_{0+}$ and $V_{0-}$ are perfectly symmetrical with respect to the d axis, so the sum of the q values at the two points is required to be zero.

Accordingly, the sample frequency computing processor 130 may include an adder 131 adding q values ($V_{0+,q}$ and $V_{0-,q}$) at two sampling points which are consecutively present above and below the d axis, with respect to the d axis.

Also, by taking into consideration that an on/off sequence changes every sampling cycle, there is provided a multiplier 135 multiplying the value output from the adder 131 by a value of 1 or −1. The value of 1 or −1 provided to the multiplier 135 is a value in which two values are alternately output from a sequence discriminator 132.

A frequency controller 133 determines a frequency change value ΔF* in such a manner that the value output from the multiplier 135 converges into zero.

Next, another adder 134 adds the frequency change value ΔF* to a value obtained by dividing the switching frequency Fsw corresponding to one rotation period by the desired number of samples (here, 18 samples), and finally generates the sampling frequency Fsamp*.

In the meantime, in the case of 18-sample phase control, a change in the state of the inverter voltage may occur within a single sampling. Referring back to FIG. 3, according to the embodiment of the present disclosure, the HOVM controller 122 moves the voltage command $V_{dqss}$Ref corresponding to the sampling point in a direction (the voltage corresponding to $V_{dqss}$Ref' in FIG. 3) farther away from the origin in the stationary coordinate system due to the reference gain. Next, the voltage modulator 123 moves the HOVM voltage command $V_{dqss}$Ref' through minimum distance overmodulation control to the side or vertex of the hexagon positioned before HOVM, and then performs voltage modulation.

Here, in the case of performing 18-sample phase control, when HOVM and minimum distance overmodulation control is performed on three sampling points formed on each side of the hexagon, the middle sampling point of the three sampling points on each side moves to the side of the hexagon. The voltage corresponding to the sampling point moved to the side may be output by dividing the voltage vectors on the opposite vertexes of the side by a predetermined ratio. For example, when the voltage moved to the side between a vertex corresponding to the voltage vector [100] and a vertex corresponding to the voltage vector [110] is formed closer to the voltage vector [100] with about 20 degrees, 66% of the voltage vector [100] and 33% of the voltage vector [110] are output. Conversely, when the moved voltage is formed closer to the voltage vector [110] with about 40 degrees, 33% of the voltage vector [100] and 66% of the voltage vector [110] are output.

Referring to this, in the embodiment of the present disclosure, by appropriately determining the sampling frequency, a point in time when switching of the inverter output voltage is performed may be adjusted. Accordingly, in the embodiment of the present disclosure, freedom of inverter control may be enhanced.

Figure 5:
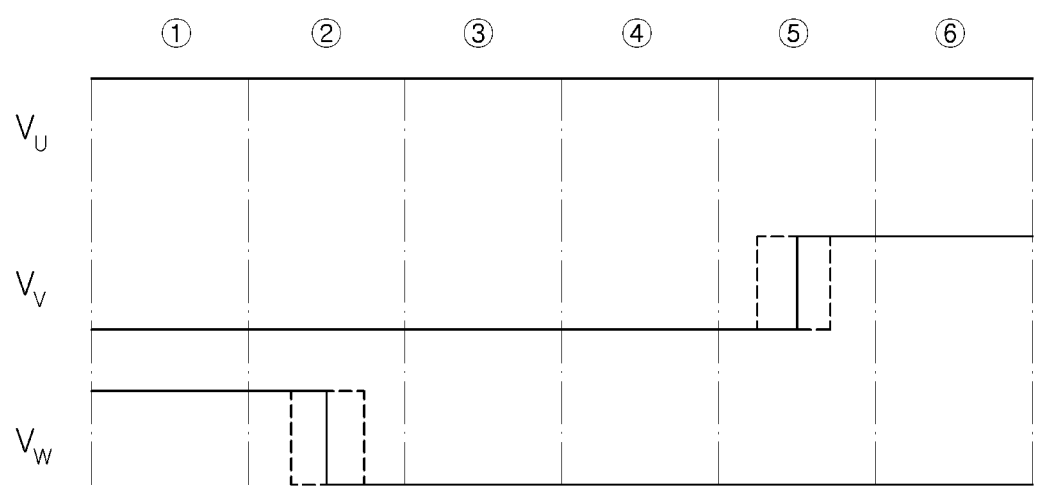
FIG. 5 is a diagram illustrating normal output voltages of 18-sample phase control performed by an apparatus for controlling an inverter to drive a motor according to an embodiment of the present disclosure.
Figure 6:
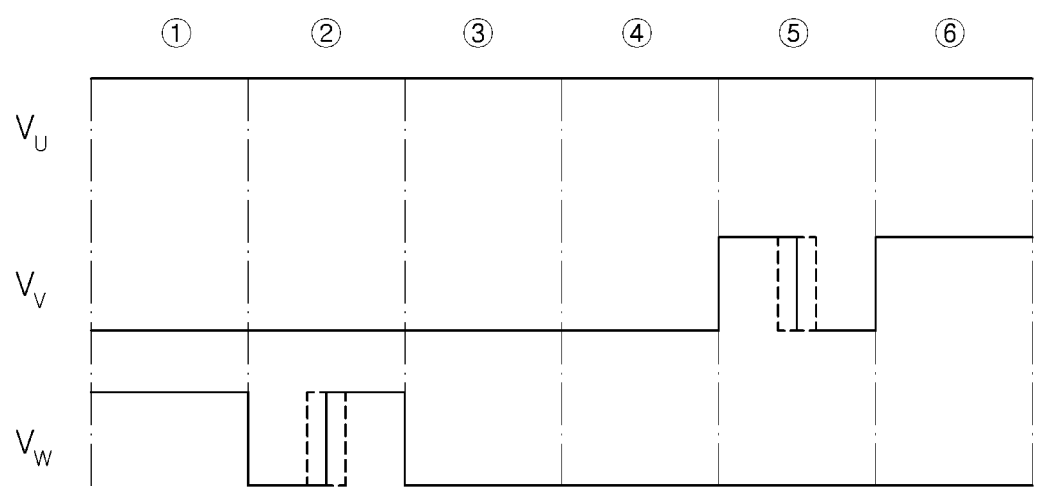
FIG. 6 is a diagram illustrating abnormal output voltages in which additional switching occurs due to anti-phase in a process of 18-sample phase control performed by an apparatus for controlling an inverter to drive a motor according to an embodiment of the present disclosure.

FIG. 5 is a diagram illustrating normal output voltages of 18-sample phase control performed by an apparatus for controlling an inverter to drive a motor according to an embodiment of the present disclosure. FIG. 6 is a diagram illustrating abnormal output voltages in which additional switching occurs due to anti-phase in a process of 18-sample phase control performed by an apparatus for controlling an inverter to drive a motor according to an embodiment of the present disclosure.

Generally, in the voltage vector diagram, when the sampling point is formed within the hexagon, switching occurs at every switch in each sampling section on the basis of the position of the sampling point.

Also, as described above, when the sampling point is positioned on the side of the hexagon in the voltage vector diagram, a sequence of one on or off operation occurs in one switch on the basis of the position.

Also, when the sampling point is positioned on the vertex, only one single state corresponding to the vertex is output. That is, when applying the 12-sample phase control technique (KR 10-2016-0007850 A) described as the conventional technique, one output is formed only at each sampling time and no on/off sequence occurs in the sampling section.

As shown in the embodiment of the present disclosure, in the case of 18-sample phase control, 12 output voltages are determined by the vertexes so that switching does not occur. In the case of the sampling point moving to the side, switching occurs in the sampling section.

Switching during this sampling section is shown in FIG. 5.

In the meantime, the internal setting of a microcomputer controlling sampling causes that the sampling section alternates between a sequence in which the switch is turned on and a sequence in which the switch is turned off. That is, it is a general setting that the switch is turned on in the sampling section with the on-sequence and the switch is turned off in the sampling section with the off-sequence. For example, in FIG. 5, assuming that the sampling section ① is the on-sequence section and the sampling section ② is the off-sequence section, regarding Vw in the sampling section ②, since the switch was turned on in the preceding sampling section ①, the switch is required to be turn off the following sampling section ③. Therefore, it is ideal that the switch is turned off during the sampling section ②, which is the off sampling section. However, as shown in FIG. 6, when the switch is required to be turn on during the sampling section ② which is the off-sequence section, the switch is required to be turn off in the sampling section ③. Therefore, additional switching occurs and the output is reduced. As shown in FIG. 6, at the middle or the sampling point close to the middle of each side of the hexagon in the voltage vector diagram, the on/off sequence in the relevant sampling section is not maintained and additional switching occurs due to the anti-phase. This additional switching reduces the output voltage in magnitude, and as a result, the motor output is not generated as much as desired.

In order to solve this problem, as shown in FIG. 4, within the apparatus for controlling the inverter to drive the motor according to the embodiment of the present disclosure, the sample frequency computing processor 130 may include the sequence discriminator 132 that discriminates the sequence of the relevant sampling section. The sequence discriminator 132 may output a value of 1 or −1 corresponding to the alternate on-off sequences of the microcomputer controlling sampling. The value of 1 or −1 output from the sequence discriminator 132 is multiplied by the sum of the q axis voltage values, so that the frequency controller 133 determines the frequency change value ΔF*. The value of 1 or −1 output from the sequence discriminator 132 enables control according to the frequency change value ΔF* to be performed when the phase of switching performed in the relevant sampling cycle is the same as the phase of the sequence set in the microcomputer. However, when the phase of switching in the relevant sampling cycle is opposite to the phase of the sequence set in the microcomputer (switching off in the on-sequence setting or switching on in the off-sequence setting), the positive or negative sign of the sum of the q axis voltage values is reversed and the sampling frequency Fsamp becomes faster or slower. When this process is repeated, the sampling frequency Fsamp is determined in such a manner that the phase of switching performed in the relevant sampling cycle is the same as the phase of the sequence set in the microcomputer.

As described above, the sampling frequency determined by the sample frequency computing processor 130 is provided to the current control processor 120, and the current control processor 120 performs HOVM and minimum distance overmodulation control using the received sampling frequency. A signal (gate signal) generated by minimum distance overmodulation control is used to control the switching elements within the inverter 20.

In the above description, 18-sample phase control has been described mainly, but this is only an example. Various embodiments of the present disclosure are applicable to a case in which 6-step control is performed by multi-sampling, for example, 30 samples, 42 samples, or the like, which exceeds 12 samples, where sampling is performed as being adjacent to the middle of each side of the hexagon representing the voltage vector in the stationary coordinate system.

Although the exemplary embodiments of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. An apparatus for controlling an inverter to drive a motor, the apparatus comprising:

a current control processor generating a voltage command for generating d/q axis current detection values, which are obtained by measuring a current supplied to the motor, to follow a d/q axis current command for driving the motor, wherein the current control processor converts the voltage command, which is sampled according to a sampling frequency generated based on a voltage vector phase of the voltage command, into a voltage vector corresponding to a point on each vertex and each side of a hexagon in a voltage vector diagram to apply a resulting value to the inverter which drives the motor;

a sample frequency computing processor computing the sampling frequency based on the voltage vector phase of the voltage command and a reference number of sampling times during one rotation period of the motor;

a first adder adding, with respect to a d axis on the hexagon in the voltage vector diagram, q values at two sampling points which are consecutively present above and below the d axis;

a sequence discriminator determining reference on and off sequences repeated in successive sampling sections for the sampling frequency and alternately outputting values of 1 and −1 corresponding thereto every sampling cycle;

a multiplier multiplying a sum output from the first adder by the value output from the sequence discriminator;

a frequency controller determining a frequency change value such that a result of multiplication by the multiplier converges into zero; and a second adder adding the frequency change value and a value obtained by dividing a switching frequency of the motor by the reference number of sampling times to determine the sampling frequency, wherein the voltage vector corresponding to at least one point on one side of the hexagon in the voltage vector diagram is output by dividing voltage vectors of opposite vertexes of the side of the hexagon by a predetermined ratio.

2. The apparatus of claim 1, wherein the current control processor comprises:
   a current controller generating the voltage command;
   a high gain over voltage modulation (HOVM) controller generating multiple HOVM voltage commands corresponding to the reference number of sampling times by multiplying the voltage command by a reference gain according to the sampling frequency; and
   a voltage modulator converting the multiple HOVM voltage commands generated by the HOVM controller into the voltage vector corresponding to one point on vertexes and sides of the hexagon in the voltage vector diagram through minimum distance overmodulation control.

3. The apparatus of claim 1, wherein the sample frequency computing processor determines the sampling frequency with respect to a d axis on the hexagon in the voltage vector diagram, such that a sum of q values at two sampling points which are consecutively present above and below the d axis is zero.

4. The apparatus of claim 3, wherein the sample frequency computing processor determines the sampling frequency by determining an on and off sequence of an inverter output in a sampling section for the sampling frequency.

5. The apparatus of claim 1, wherein the sample frequency computing processor changes a switching duty of an output voltage of the inverter by adjusting the sampling frequency.

6. The apparatus of claim 1, wherein the voltage vector corresponding to one point on the side of the hexagon in the voltage vector diagram controls switching of a switch within the inverter.

* * * * *